Nov. 22, 1938.  M. LEUPOLD  2,137,776
HAND LEVEL
Filed Sept. 14, 1936
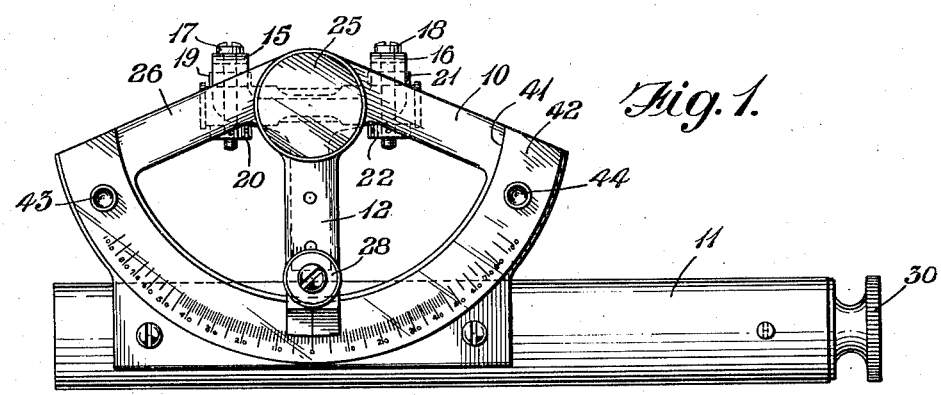
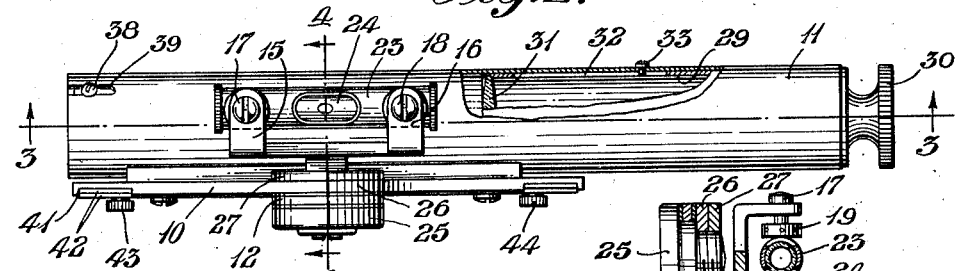
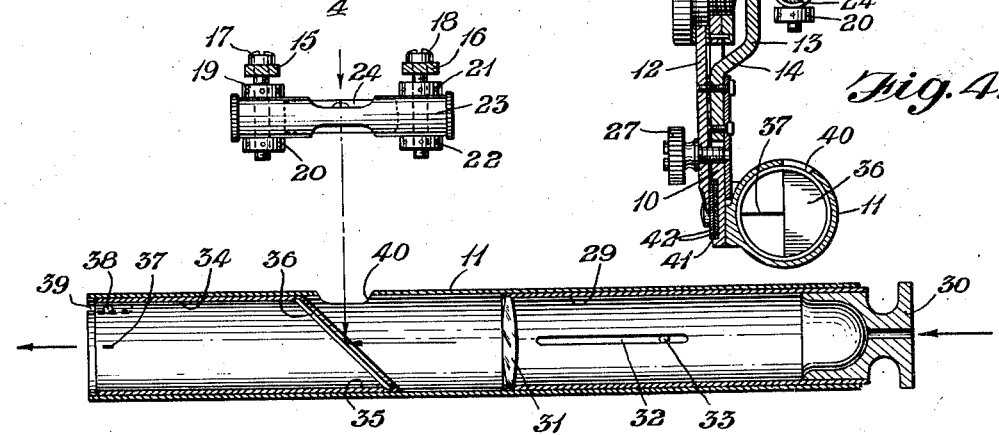
Inventor
Marcus Leupold
By Richard K. Stevens
Attorney Patented Nov. 22, 1938

2,137,776

UNITED STATES PATENT OFFICE 2,137,776

HAND LEVEL

Marcus Leupold, Portland, Oreg.

Application September 14, 1936, Serial No. 100,742

5 Claims. (Cl. 33—73)

This invention relates to leveling instruments suitable for determining extent of elevation or depression, and more particularly to leveling instruments of the hand or pocket type commonly known as Abney levels.

Levels of this type are used in a variety of ways and for different kinds of work as, for example, in surveying and measuring section lines and boundaries and other public land measurements, which are generally measured in chains of sixty-six feet, or in locating trails, roads, ditches, and the like, in which case the percentage of grade must be determined. In view of this and in order to avoid the necessity of employing two different levels each having a scale adapted for a different type of measurement, it is common practice to provide two scales on each level, and in fact extensive users of these instruments, such as the Federal Government, require the provision of two scales in their bids for supply, e. g. a topographic scale, which is based upon an angular unit represented by the ratio of one unit vertically to sixty-six units horizontally, and a percent scale, which indicates the extent of grade by percentage.

In satisfying this requirement for two separate scales on one instrument, it has been customary to provide a scale on each side of the supporting frame of the level, each scale having different indicia thereon to adapt it for different kinds of measurement. Such an arrangement, however, has proved to be very unsatisfactory, as each time it was required to employ a different scale, it was necessary to not only reverse the arc-like frame but the bubble mounting as well, and this was always attended with considerable loss of time and trouble in view of the necessity of entirely re-adjusting the instrument.

It is accordingly a principal object of this invention to provide a scale arrangement which permits quick changes of scales without the necessity of re-adjusting the leveling mechanism and which otherwise avoids the disadvantages referred to. A further object of the invention is to provide means for storing and retaining a pair of scale plates in the correct position for use and in a conveniently removable and replaceable manner.

These and other objects are accomplished by providing a relatively shallow groove on the exposed face of the supporting frame of the instrument, which is not only capable of acting as a guide for the application and removal of a pair of scale plates but also receiving and retaining such plates in operating position. The groove is most suitably of an arcuate shape and extends from one edge to another on the frame, which permits the scale plates to be readily insertable into and removable from the groove by an endwise sliding action. Furthermore, the groove is not only made deeper than the thickness of one scale plate to permit reception of more than one plate, but is less deep than the combined thickness of the pair of scale plates, so that when the plates are arranged in superimposed position in the groove they extend slightly above the exposed surface of the frame and create a slight resistance to the rotating or oscillating movement of the usual indicating arm.

A further understanding of the invention will be gained by examining the accompanying drawing, in which like numerals refer to like parts, and in which:

Figure 1 represents a side elevation of the complete hand level;

Figure 2 is a plan view;

Figure 3 is a horizontal section taken on the line 3—3 of Figure 2; and

Figure 4 is a vertical transverse section taken on the line 4—4 of Figure 2.

Referring to the drawing the numeral 10 represents a frame member which serves to fixedly support on one side thereof along its lower portion a sight tube 11 and has rotatably mounted on its upper middle portion an arm 12 which serves to indicate the angle of elevation or depression. Upon this arm is fixed a bubble mounting, indicated generally at 13, which comprises a supporting arm 14 provided at its upper portion with a pair of horizontally extending lugs 15 and 16 from which the bolts or screws 17 and 18 depend. These bolts are each provided with a pair of nuts 19 and 20 and 21 and 22 respectively, which serve to support and position a tubular casing 23 constituting a protective mounting for the bubble containing vial 24. Arm 12 is rotatably mounted on a bolt 25 positioned in the apex in the upper portion 26 of frame 10 and fastened thereto by the nut 27, and is provided with a suitable knob or similar device 28 near its lower end for moving the arm and vial 24 in accordance with the elevation or depression being measured.

Fitted for telescopically sliding action in one end of the sight tube 11 is a tube 29 which has an eye-piece 30 fastened on its outer end and a semi-circular lens piece 31 provided on its inner end. In the middle portion of tube 29 is a longitudinally extending slot 32 which cooperates with the screw 33 in positioning tube 29 and lens 31 in the sight tube 11 and permitting limited longitudinal reciprocation of these parts therein. As cordingly by sliding tube 29 within the limits allowed by slot 32 and screw 33 it is possible to focus lens 31 to obtain the clearest view of the bubble in vial 24.

In the opposite end of tube 11 is another tube 34 which is cut off at an angle of 45° at its inner end 35. Half closing this end and substantially flush with its edges, i. e. also at an angle of 45°, is a semi-elliptical mirror 36, while at the opposite end of tube 34 is a horizontal sight strip 37 which together with the straight side of the mirror forms a central point of sight as viewed from eye piece 30. Tube 34 may be reciprocated in and out of tube 11, and is guided in this movement by the screw 38 which is slidable in slot 39 and may be tightened to lock the tubes together. Thus, by sliding tube 34 to the desired extent in either direction within tube 11, it is possible to adjust mirror 36 in the best position below vial 24 for accurate viewing of the bubble through eye piece 30 and the aperture 40.

Frame 10 is also provided on its exposed vertical surface with relatively flat and wide arcuate-shaped groove 41 which extends completely from top edge to top edge thereof and thus permits the endwise insertion of a pair of scale plates 42 which may be placed in position for use by a simple circular sliding action. Plates 42 are made of thin resilient strip metal and are each provided with an aperture adjacent each end. When the plates are in correct position for angular measurement these apertures are in alignment with suitable apertures in frame 10 and together therewith are adapted to receive the screws 43 and 44 which serve not only to retain the plates in the desired position during normal use of the leveling instrument but also as stop members for arm 12. The plates extend slightly above the surface of frame 10, when they are in superposed relation, and thus provide a certain desirable frictional resistance to the movement of indicator arm 12. They are made sufficiently thin, however, to permit two of them to be simultaneously guided and retained by groove 41, and yet, being made of resilient metal, either one of them alone is capable of substantially filling the groove.

In using a level of this type together with the improvement described herein, the scale plates are first applied by sliding into position and are then fastened with the desired plate uppermost. A point or object on a level rod or staff positioned above the ground a distance equivalent to the height or distance of the leveling instrument from the ground is then sighted, and arm 12 is moved until the image of the bubble in mirror 36 appears to be in proper alignment with the hair line or sight strip 37. The angle through which arm 12 must be moved along the scale in order to bring about these conditions is an indication to the observer of the angle or number of points of elevation or depression of the object sighted with respect to the point of observation. When it is desired to make two different measurements of the same object, that is with different units of measurements, or when a different kind of work is to be done requiring the use of a different scale, it is merely necessary to remove screws 43 and 44 and either remove the top scale plate or remove both plates, substituting the top plate for the bottom one before fastening them again. In either case the withdrawal or insertion of the plate or plates is simple, and may be accomplished without disturbing the adjustment of arm 12 and the bubble mounting owing to the easy sliding action.

Thus the present invention has provided an improvement in Abney hand levels which permits a variety of measurements to be made with the same instrument using different types of scales and makes it possible to change scales with great dispatch and without the necessity of taking the instrument apart or in any way altering its adjustment. The scales may be conveniently stored in the groove in which they are used, and it is feasible to take measurements with either one or both of the scale plates in position, it being preferable, however, to have both in place owing to the slight braking action they exert on the indicator arm.

It is within the contemplation of the invention to employ any other means of fastening the plates to the frame as a substitute for the bolts or screws hereinbefore referred to, as it is merely essential that the plates be fastened in the correct position for measurement and yet are conveniently and quickly removable. Furthermore, it is to be understood that the invention is capable of other modifications and applications and should therefore be limited only by the scope of the appended claims.

I claim:

1. In a leveling instrument of the class described, a frame member provided with an arcuate groove, and a separate and separable scale member snugly fitting in and retained by said groove, said scale member being removable from said groove and said groove having in its bottom portion scale indicia which are different than those on the separable scale member, whereby upon removing said separable scale member a different scale is exposed.

2. In a leveling instrument of the class described, a frame member, a separate and separable scale member, and an arcuate groove on the frame for removably holding and positioning said scale member, said groove extending from one edge to another edge of said frame, and having in its bottom portion scale indicia which are different than those on the separable scale member whereby the scale member may be readily placed into and removed from operative position by an endwise sliding movement to cover and expose respectively the indicia in said groove.

3. In a leveling instrument in the class described, a frame member, an indicating arm supported on the frame member, a separate and separable scale member, and a groove on the frame for removably holding the scale member in cooperative position with said arm, said groove extending from one edge to another edge of said frame and having in its bottom portion scale indicia which are different than those on the separable scale member, and said indicating arm being firmly held against the frame and being frictionally movable therealong, whereby said arm may be adjustably positioned with respect to said scale member and said scale member may be removed to expose the scale indicia in said groove without altering the adjustment of said arm.

4. In a leveling instrument of the class described, a frame member in the form of a spider having an arcuate portion and a pivotal center, an indicating arm oscillatable about said center, an arcuate groove in said arcuate portion concentric with said center, and a scale member substantially fitting in said groove in cooperative position with said arm and slidably removable therefrom, said groove having in its bottom portion scale indicia which are different than those on the removable scale member, whereby upon removing said removable scale member a different scale is exposed.

5. In a leveling instrument of the class described, a frame member, a separate and separable scale member, and means for removably fastening said scale member in a predetermined position upon the surface of said frame member, said frame member having on the portion of its surface beneath said scale member scale indicia which are different than those on the separable scale member, whereby upon removing said scale member a different scale is exposed.

MARCUS LEUPOLD.